(12) United States Patent
Cannistraro et al.

(10) Patent No.: US 8,505,056 B2
(45) Date of Patent: Aug. 6, 2013

(54) UPDATING PROPERTIES OF REMOTE A/V PERFORMANCE NODES

(75) Inventors: Alan Cannistraro, San Francisco, CA (US); Jeffrey L. Robbin, Los Altos, CA (US); Amandeep Jawa, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1170 days.

(21) Appl. No.: 12/171,278

(22) Filed: Jul. 10, 2008

(65) Prior Publication Data
US 2010/0007458 A1    Jan. 14, 2010

(51) Int. Cl.
*H04N 7/18* (2006.01)

(52) U.S. Cl.
USPC .............................. 725/81; 725/80; 348/734

(58) Field of Classification Search
USPC ..... 725/78–85, 131–134, 139–142, 151–153; 348/734
See application file for complete search history.

(56) References Cited

U.S. PATENT DOCUMENTS

| 6,127,941 | A | 10/2000 | Ryzin |
| 7,158,757 | B2 | 1/2007 | Buttet |
| 7,492,278 | B2 * | 2/2009 | Zigmond et al. ........... 340/12.52 |
| 2008/0107405 | A1 * | 5/2008 | Chen et al. .................... 386/124 |
| 2008/0201754 | A1 * | 8/2008 | Arling et al. .................. 725/114 |

FOREIGN PATENT DOCUMENTS

| WO | WO 2006/055484 A1 | 5/2006 |
| WO | WO 2006/097861 A2 | 9/2006 |
| WO | WO 2007/075376 A1 | 7/2007 |

OTHER PUBLICATIONS

Jeffrey Nichols, Duen Horng Chau and Brad A. Myers, "Demonstrating the Viability of Automatically Generated User Interfaces," Proceedings of the SIGCHI conference on Human factors in computing systems, Apr. 28-May 3, 2007, San Jose, California, ACM, New York, NY, 2007, pp. 1283-1292.

* cited by examiner

*Primary Examiner* — Annan Shang
(74) *Attorney, Agent, or Firm* — Park, Vaughan, Fleming & Dowler, LLP

(57) ABSTRACT

Aspects include systems, computer readable media and methods for remotely updating properties of Audio/Visual (A/V) performance nodes that can receive A/V content through a wireless network from a central content source. The central content source can maintain information about properties of such nodes, providing such information to a device configured with remote control software, upon request. The remote control device can accept user inputs relating to properties updates, indications of such being provided to the central content source for distribution to nodes whose properties were updated. Examples of updatable properties include on/off toggling, and volume controls. Updating such properties can be protected by passwords. The central content source can be configured as software executing on a personal computer operable to communicate over the Internet for obtaining access to streaming and/or downloadable A/V content. Remote control device examples include phones that can be networked to receive node properties data, obtain user inputs affecting such data, and transmit that data back to the central source.

19 Claims, 4 Drawing Sheets

| | Identifier | On/Off Status | Audio Capable | Video Capable | Parental Control | Content Limitations | Mood Preset | Equalizer | Relative Volume |
|---|---|---|---|---|---|---|---|---|---|
| 605 | Office | On | Yes | No | Yes | None | Talk | None | 3 |
| 610 | John's Room | On | Yes | Yes | Yes | PG | Rock | 3 Channel | 7 |
| 615 | Living Room | Off | Yes | Yes | Yes | PG-13 | Movie | 5 Channel | 5 |
| 620 | Master Bedroom | Off | Yes | No | No | None | Quiet | None | 3 |

UPDATING PROPERTIES OF REMOTE A/V PERFORMANCE NODES

BACKGROUND

1. Field

The following relates to digital media aggregation and distribution, and more particularly to remotely controlling properties of devices at which such media is performed.

2. Related Art

Currently there exists centralized media distribution from a media storage library to one or more distributed points where the media can be performed. For example, Apple iTunes® running on a personal computer can communicate using wireless networking with one or more remote distribution points for media stored in a library associated with the iTunes application, or otherwise available through the iTunes application. For example, the personal computer can be located in a home office, while points where media can be received can include a station in one or more bedrooms, in a family room, living room, outside, etc. Although this architecture was an advance from whole house audio/visual systems requiring separate cabling for content distribution, further advances in the area remain desirable.

SUMMARY

Aspects include a distributed audio/visual (A/V) content system and components thereof. The system includes a source of data representative of digital A/V content. The source is configured for distributing portions of the data to one or more remote reception devices capable of receiving the data from the source, and using it for performing the A/V content. The system also includes a computer readable medium interfaced with the source of A/V content and storing information descriptive of respective sets of properties for each of the remote reception devices. The system also includes a remote controller device interfaced with the source, and configured to receive the remote reception device property information, produce a user interface displaying a menu based on the received property information, receive input from a user to change one or more device properties, and communicate indications of such changes to the source. The source communicates respective updated property information to remote reception devices whose properties were indicated as having been changed, and the remote reception devices effect those changes. Other aspects include a tangible computer readable medium storing instructions for controlling a computing device to perform certain functions disclosed throughout this specification.

Other aspects include a method relating to remote control of A/V performance devices. The method includes obtaining at a controller, from an A/V content distribution hub, over a wireless network, a set of properties associated with a first A/V performance device that is coupled for reception of A/V content from the distribution hub over the wireless network. The method also includes accepting user input for changing one or properties of the set, forming a message indicative of the changes to the one or more properties; and transmitting the message to the A/V content distribution hub for retransmission to the performance device associated with the changed properties.

Still other aspects include a remote control device for control of A/V performance devices. The device includes a wireless networking interface for interfacing with an A/V content distributor operable for distributing A/V content to a plurality of performance nodes. Each of the performance nodes is associated with a respective set of properties maintained by the A/V content distributor. The device also includes a processing resource; and a computer readable medium storing instructions executable by the processing resource for implementing a method.

The method includes receiving user input indicative of a request to change settings associated with any of a plurality of A/V performance devices that are coupled for receiving A/V content from a distribution hub, obtaining, using the interface and from the distribution hub, data indicative of settings associated with the one or more of the A/V performance devices, displaying a menu including at least portions of the settings data, accepting changes to the settings, and forming one or more messages having data indicative of accepted changes, the messages for transmission over the interface to the distribution hub for distribution to any performance device whose settings were changed.

DESCRIPTION

The following description is presented to enable any person skilled in the art to make and use an A/V system including a centralized A/V distribution point, a plurality of performance nodes, and a remote control for configuring properties of the performance nodes through the distribution point. Various modifications will be readily apparent to those skilled in the art based on the disclosures here, and principles defined herein may be applied to other embodiments and applications without departing from the spirit and scope of the invention. Moreover, in the following description, numerous details are set forth for the purpose of explanation. However, one of ordinary skill in the art will realize from these disclosures that the invention might be practiced without the use of these specific details. In other instances, well-known structures and processes are shown in block diagram form in order not to obscure the description of the invention with unnecessary detail. Thus, the present invention is not intended to be limited to the examples shown, but is to be accorded the widest scope consistent with the claims appended hereto.

Figure 1:
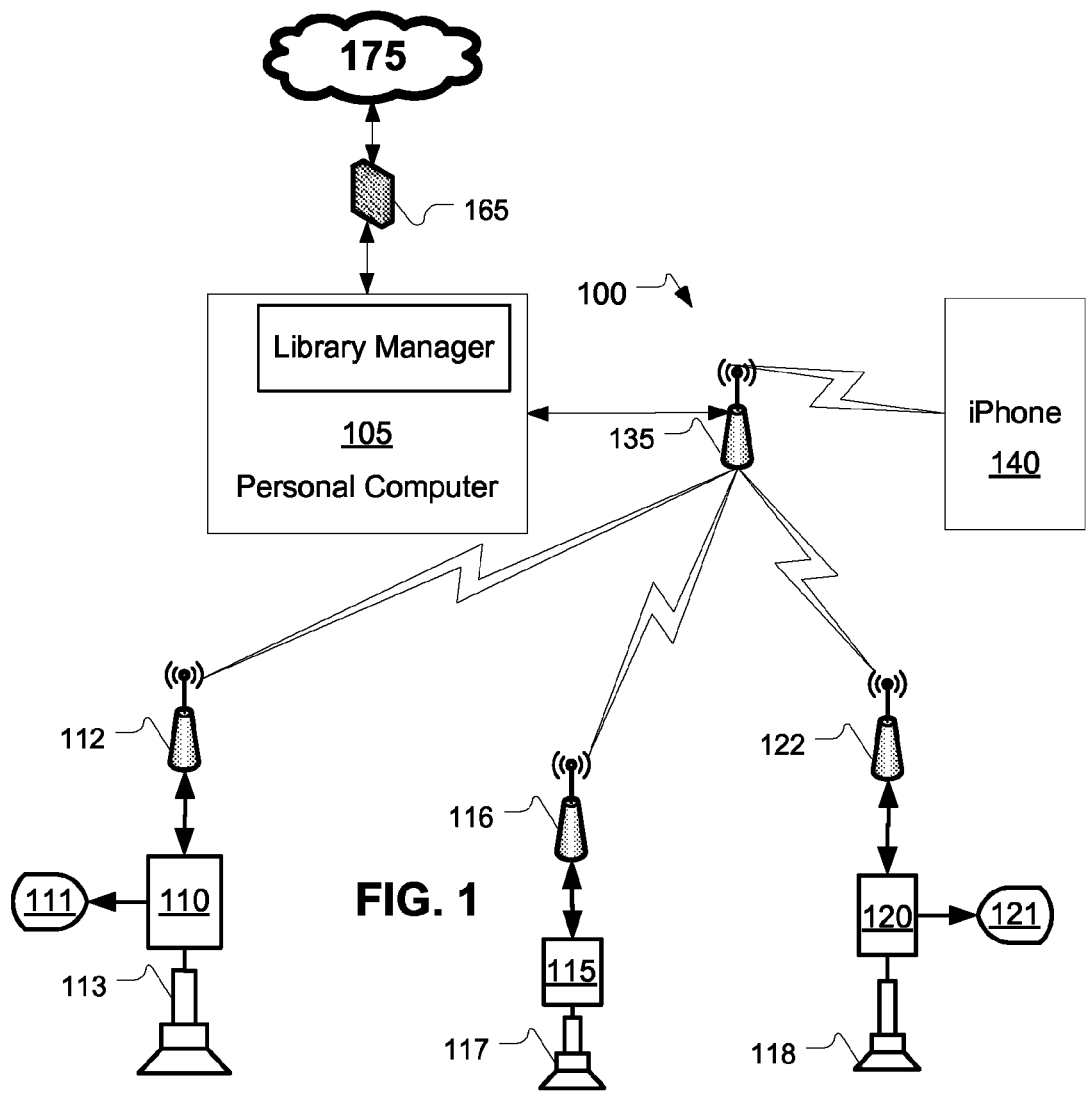
FIG. 1 illustrates an example system architecture for a A/V system having a centralized content distribution hub with a plurality of A/V performance nodes, and a device configured with remote control software.

FIG. 1 illustrates aspects of a system 100 including a personal computer 105, such as an HP Pavilion, iMac™, Dell Vostro, or a Macbook Pro, configured for running a Audio/Visual (A/V) content distribution and storage program, such as iTunes. Computer 105, as configured with such software provides a centralized A/V content distribution point.

Computer 105 communicates with a wireless access point 135, which in turn can communicate with wireless access points 112, 116, and 122. In some examples, each of the access points 112, 116, 122, and 135 operate according to one or more 802.11x series protocols (e.g., 802.11g, 802.11n, and so on). Each of the access points 112, 116, and 122 respectively provide wireless network access to one of A/V performance nodes 110, 115, and 120. A/V performance node 110 is operable for outputting visual content to display 111 and audio content to speaker 113. A/V performance node 115 is operable for outputting audio content to speaker 117, but does not output information to any display. Likewise, A/V performance node 120 outputs visual content to display 121, and audio to speaker 118.

Each of these performance nodes can receive A/V content from computer 105. Generally, such content is distributed digitally, decoded, and converted into a format appropriate for the display and/or speaker(s) attached thereto.

Computer 105 may contain an add-in card, or have an integrated MAC/PHY to enable communication between those devices, and their respective computer 105 and access point 135 (computer 105 would be operate to communicate with others of the access points). Each of the A/V performance nodes may be coupled directly (e.g., by an Ethernet cable or another cabling or direct connection mechanism to access points 112, 116, and 122. In some examples, the access points 112, 116, and 122 can be built into containers also having integrated their respective nodes, such that the container would include a power connection, audio and audio/video outputs, wireless LAN functionality and appropriate decoding circuitry for supported media types.

A phone 140, such as a Blackberry or an iPhone, also equipped with an 802.11 MAC/PHY, is shown as communicating with access point 135. This example shows a phone 140 equipped with wireless LAN as a device equipped with software enabling the device to control functionality remotely, however, any device having a wireless communication capability and capable of operation according to the following disclosures can be used.

Computer 105 maintains data relating to properties of the performance nodes 110, 115, and 120. In one example, each performance node can provide data to computer 105 (or whatever device is being used as a centralized content distribution point in a particular implementation) relating to whether it can provide only audio output, or video output (i.e., whether it is connected to speakers and/or a display). Various implementations according to system 100 include dedicated hardware, rather than a multi-purpose computer (computer 105), for implementing the content distribution point.

Thus, in system 100, computer 105 maintains information pertaining to characteristics of A/V performance nodes available for sending A/V content from the distribution point. The A/V content is transmitted digitally over the network, and decoded at each receiving performance node.

In systems according to system 100, points where content is performed are often located in different rooms of a house, for example, and being able to control settings for A/V performance nodes in a given system, without directly accessing the central distribution point (e.g., computer 105) would be desirable. Providing such functionality on a device capable of wirelessly networking to exchange information with the centralized distribution point (e.g., computer 105) advantageously would allow using a device that some consumers already have to function as a remote control for their home A/V system.

Computer 105 provides storage for a media library that can be associated with a library manager such as iTunes. Computer 105 can communicate through a firewall 165 and over the Internet 175 with any of a variety of sources for content. Content can be downloaded and stored at computer 105, and computer 105 also can obtain streams of content from Internet-based hosts. In such circumstances, computer 105 can function as a relay for such information to be received from Internet 175, sent through the wireless network (composed of base stations 135, 112, 116, and 122), for performance at one or more selected performance nodes.

In example system 100, each base station 135, 112, etc. can be a connection point for phone 140 to communicate with computer 105. For example, phone 140 can connect with base station 112, which would relay data to and from base station 135 for transmission to and reception from computer 105. Because phone 140 can connect to any base station, phone 140 and the base stations in the system would attempt to allow phone 140 to connect to the base station to which it has the best signal strength.

In sum, system 100 includes a centralized point from which A/V content can be distributed via wireless networking to a plurality of A/V content performance devices, located in disparate positions, and capable of wirelessly receiving such A/V content from the centralized point.

Figure 2:
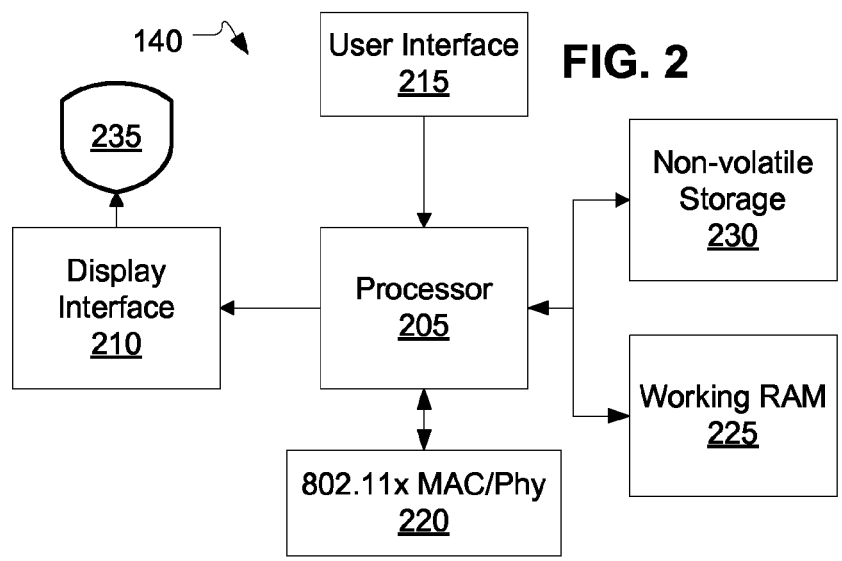
FIG. 2 illustrates example components that may be used in implementing remote control devices according to present examples.

FIG. 2 illustrates further implementation details concerning potential embodiments of phone 140, which can be configured to function as a remote control for A/V performance nodes.

FIG. 2 illustrates that phone 140 includes a processor 205, which is coupled to receive user interface 215 inputs, produce visual output to display interface 210, which in turn uses such visual output to drive display 235. Processor 205 also is operable to read and write data from working RAM 225, and non-volatile storage 230, such as flash memory, and the like. Processor 205 also is coupled for sending and receiving data over a wireless network using 802.11x MAC/PHY 220. Processor 205 can be configured to execute programs specified by computer readable instructions stored in non-volatile storage 230 and/or in working RAM 225, or received over MAC/PHY 220.

The constituent components and arrangement of same in FIG. 2 can differ in implementations. For example, non-volatile storage may function as a working RAM for certain applications. As memory technology advances, a notion of maintaining separate RAM and non-volatile memory in portable devices may largely recede. Non-volatile memory also can be a hard drive or another kind of magnetic or optical storage. The components shown in FIG. 2 also can be integrated; for example, processor 205 can be an ARM core formed with MAC/PHY 220 (or the MAC only, with discrete magnetics, etc.), and some or all of RAM 225. As such, it would be understood that a variety of devices implemented in any number of ways can be used as a controlling device in system 100 (FIG. 1).

FIG. 2 also can represent example components of computer 105, except that certain components would generally be more full-featured in computer 105. For example, processor 205 would be more powerful, and non-volatile storage 230 would be larger. User interfaces may include larger keyboards, separate mice, and so on. Display 235 may be larger, and there may be a more power discrete graphics processor interfacing with processor 205 for driving display 235.

A/V performance nodes may have a variety of implementations. Simpler A/V nodes may include a wireless LAN transmitter and receiving, one or more speakers, and logic for decoding received digital audio data and transforming it into analog signals for performance. Such logic can include a codec appropriate for a compression technology being used, decryption technology appropriate for a digital rights management technology being used, if any, a digital to analog converter (for analog speakers), and one or more output ports, including digital and/or analog output ports. Other functionality can include amplification circuitry, filtering circuitry, power conversion transformers, and so on. Output ports can include stereo capability, or multiple channel outputs, such as Dolby® Digital audio (e.g. 5.1 or 6.1 channel audio), and so on. Although A/V performance nodes could be, in some examples, fully functional computers, it is preferable to realize more advantages of the present disclosures by implementing A/V performance nodes as devices that self-configure with computer 105, and can be managed remotely from and/or through computer 105.

Figure 3:
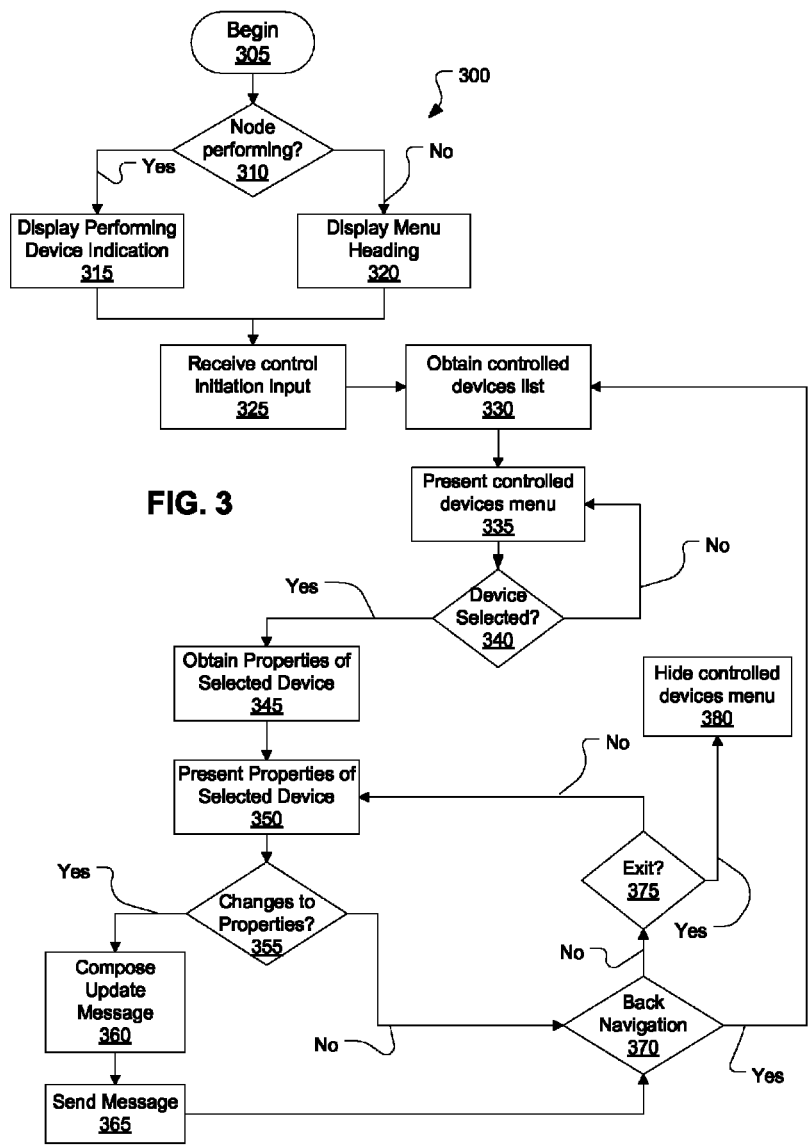
FIG. 3 illustrates steps of a method performable in a remote control device according to present examples.
Figures 4A, 4B:
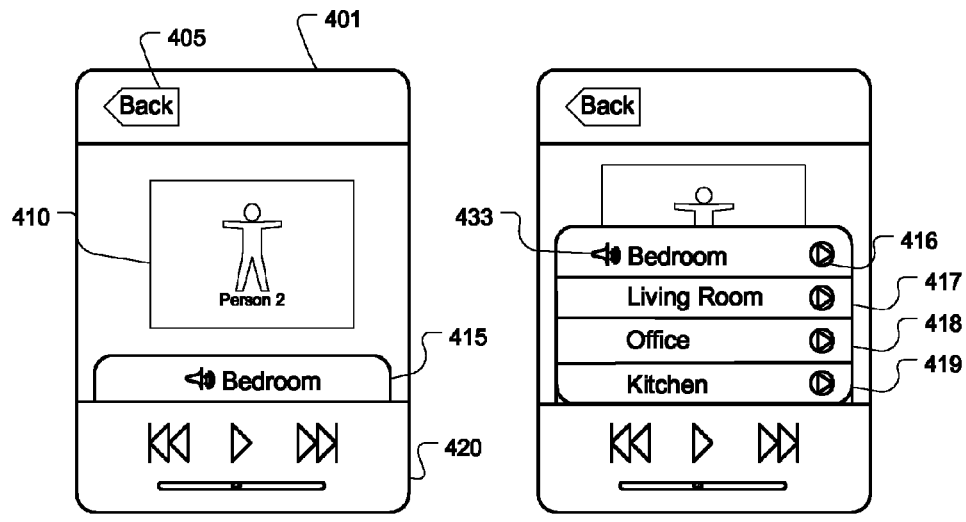
FIGS. 4*a*-4*c* illustrate examples of a screen of a remote control device.
Figure 4C:
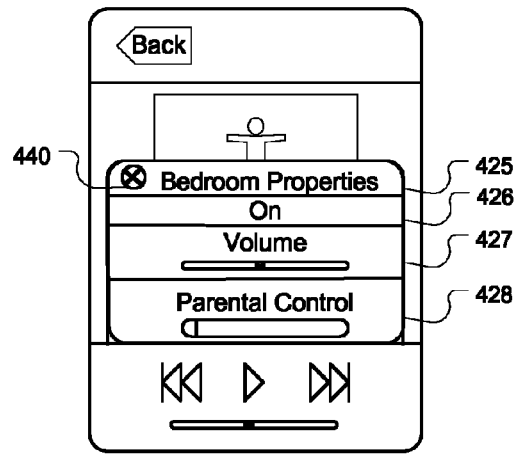

FIG. 3 shows steps of a method 300 executable by a remote control device, such as phone 140. Depictions of example user interface screens for phone 140 during execution of some steps of method 300 are shown in FIGS. 4*a*-4*c*. At 310, there is decision as to whether there currently is a performance node of performance nodes 110, 115, and 120 (FIG. 1) being sent output from computer 105 (e.g., determine whether music being performed by any of such nodes). If so, then phone 140 can display an indication of such activity.

For example, FIG. 4*a* illustrates a touch sensitive display 401 for phone 140, having content displayed according to the following examples. Display 401 includes a playbar 420, a back arrow that allows navigation to one screen previous for any menu navigation context, and an album art portion 410. Display 401 also includes an indication 415 that a node currently performing A/V content in the system is a "Bedroom" node. In an absence of a currently performing node, display 140 can display a menu selection allowing retrieval of performance nodes recognized by computer 105.

Thus, a user of phone 140 can immediately access configuration information for a currently performing node. Where multiple such nodes are performing, then either all such nodes can be displayed, which would cause some addition occlusion of album art 410, or a most recently accessed node can be shown (e.g., one most recently turned on); other node display selection functionality also can be provided, as explained below.

If a user selects the currently performing node indication, e.g., Bedroom 415 of FIG. 4*a*, then phone 140 can obtain 330 information for listing controlled devices (e.g., performance nodes) currently identified by computer 105, or phone 401 can navigate directly to settings for the currently performing node, as shown in FIG. 4*c*. For the example, where a touch in the location of display 401 showing the current node (i.e., Bedroom 415) navigates to a listing of controlled devices, a list of such devices are displayed to the user, as shown in FIG. 4*b*, where performance nodes in the bedroom 415, a living room 416, an office 418 and a kitchen 419 are shown. Alternatively, signal strength measures used to determine to what base station phone 140 connects also can be used to select what performance node should be initially displayed. For example, signal strength can be used to determine that the phone is in the living room, and thus phone 140 would first display an indication of that location.

FIG. 4*b* illustrates that each performance node (bedroom, living room, office, and kitchen) can be associated with a respective additional properties arrow 416, 417, 418, and 419. A user can select any of these arrows to navigate to a respective display in accordance with FIG. 4*c*. Selection of such an arrow can correspond with the step 340 (method 300, FIG. 3) of selecting a device, which causes the phone 140 to respond by obtaining, from computer 105, properties for that selected device. Thus, in this example, phone 140 does not maintain a comprehensive view of what controlled devices exist in a particular network or system, or what properties such controlled devices have. Rather, information can be obtained by phone 140 from computer 105 responsive to user actions that cause such information to be relevant. So, in systems according to such an example, computer 105 can maintain information about controlled devices, including admitting or excluding additional controlled devices, without having to update information at phone 140 that may not be used at known particular time.

Another interaction that can be supported by display 401 is that a user's directly selecting the area of the respective tab section (e.g., the text area) for a particular node, can be interpreted as input to toggle a state of that node (e.g., as the bedroom currently is on, tapping the area where "Bedroom" is displayed will toggle that node to an off state).

Some of the properties that can be supported by controlled devices (here, performance nodes) are shown in FIG. 4*c*, and include an on/off toggle area 426, and information about a current state of such a property can be shown (e.g., that the Bedrom performance node currently is "on"). Also apparent is that this property can be adjusted in multiple ways, in that it can be adjusted by tapping in area 426, or as described above.

Another property is a relative volume 427, which can be adjusted by the slider bar control illustrated. A user can manipulate such a slider by sliding an appendage across the area occupied by the slider bar. The relative volume is interpreted on a relative scale such that the performance node itself translates that relative volume information into an actual volume.

Another property for performance nodes includes a parental control password protection 428. In some usage models, a number of family members may each be in possession of a phone capable of controlling performance nodes according to these examples. Because a parent may desire to restrict a child's ability to adjust any controlled property, such as turning a node off or one, verification of a password may be required prior to accepting property changes from a given phone (or other device configured with functionality according to these disclosures).

In this example, a user would enter a password in the area provided; phone 140 would formulate a message having that password, and computer 105 would validate such password. Thus, information sufficient to validate the password need not be stored at phone 140. A message from computer 105 indicating acceptance or rejection of a given password attempt may be acknowledged within parental control area 428, or via another suitable means. Upon password verification, changes to properties made at phone 140 would be accepted as valid changes at computer 105.

In some examples, each performance node has separate passwords. In other examples, one password is provided for all nodes. In still further examples, the system uses a hierarchy of passwords, such that a parent's password can function as a master password for all nodes, while a child's password can function only for a node that a parent wishes to give that child additional control over, such as that child's bedroom. In still further examples, validity of passwords can be restricted to certain properties.

Method 300 then also includes detecting 355 whether changes have been made to any property (assuming authorization for making such changes). If changes have been made, then one or more messages including information indicative of such changes are composed 360 and sent by phone 140 to computer 105.

Upon message transmission, or when no changes were detected, back navigation is detected 370 (e.g., detection of selection of back arrow 405). If back navigation is detected, then an earlier screen is displayed (e.g., navigation from the display shown in FIG. 4c to that of FIG. 4b is accomplished, which is the particular example shown in method 300). Where updates where effected, back navigation can also cause phone 140 to obtain refreshed information displayed from computer 105 (e.g., if Bedroom node were turned off, then that information would be reflected by removal of speaker icon 433).

Also, it can be detected whether the user wishes to exit from the controlled devices menu entirely, by detecting selection of exit indicator 440. Exit indicator 440 can appear whenever a plurality of user interface levels were navigated to reach a current display (e.g., two levels were navigated to reach the display of FIG. 4c), so that a user can exit without having to repeatedly select back arrow 405.

The method 300 and example displays of phone 140 primarily were for illustrating user interaction with phone 140 for effecting control over performance nodes, such as performance nodes 110, 115, and 120 of FIG. 1. Such control involves from computer 105 properties of performance nodes to be controlled, as well as communicating updates to such properties back to computer 105 for distribution to controlled nodes.

Figures 5, 6:
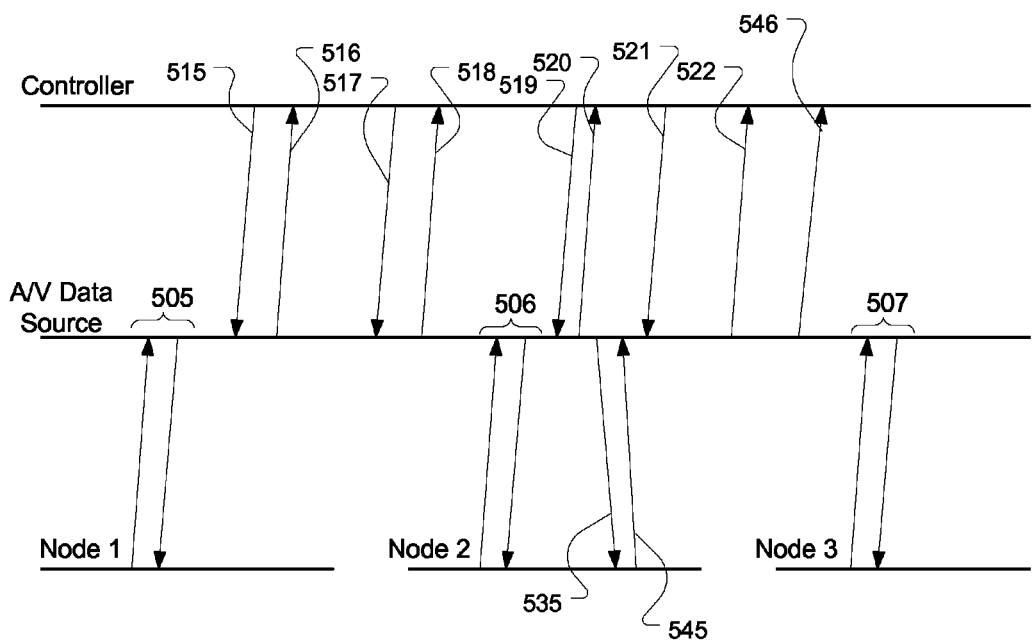
FIG. 5 illustrates an example of messages that may be transmitted between different components of systems according to the example of FIG. 1.
FIG. 6 illustrates an example of properties for A/V performance nodes, which can be controlled by a remote controlled device according to the present description.

FIG. 5 illustrates a signal ladder 500 that shows an example of what messages can flow between components in a system including a central A/V distribution point (e.g., computer 105), one or more controlled A/V performance nodes (e.g. nodes 110, 115, and 120), and a controlling device (e.g., phone 140). Signal ladder 500 is shown from the point where all communicating devices already have established LAN wireless communication capability such that information can be exchanged between devices as described. Such establishment can include each device authenticating with a wireless base station using pre-shared keys (e.g., WPA or WPA2). A user's configuring the devices with specific keys allows the establishment of communication only with devices authorized to participate in that network (i.e., configuring phone 140 with the same key that the user programmed into base stations 112, 116, 122, and 135 allows exclusion of devices not having that key, while permitting phone 140 to communicate with any such base station).

Also, further encryption or other content control of each session can be effected to prevent a user having a device authorized to be on the network from snooping communications relating to updating properties of controlled performance nodes. Thus, where parental controls are in force, this additional control reduces a chance that such communications can be sniffed and used to determine a parental password.

Now, turning to signal ladder 500, initial communications 505, 506, 507 can be between each of the performance nodes (labeled Node 1, Node 2, Node 3), to register reach node with a source of A/V Data. These communications 505, 506, and 507 may include multiple sets of messages where nodes 1, 2, and 3 describe their capabilities (e.g., audio or audio/video capability) to the source of A/V data, and otherwise become aware to the A/V data source. Such communications 505-507 can be initiated either from the A/V data Source or by each node, depending on implementation.

Between the A/V data source and the controller, a first message can be a request (515) to change one or more properties of any of nodes 1-3, which can be generated at a start of an application for such editing. For example, within a music performance application, there can be provisions made for allowing changing of one or more properties of devices for performing A/V content. The A/V data source responds with a message (516) containing a list of devices identified by it that can be controlled. The controller provides a message indicating user selection of one of the devices (517), and the source responds with a message (518) identifying properties that can be updated for the selected device. With a list of updated properties for a selected device shown, the user may enter a password for obtaining access to updating the properties, and such entered password is provided in a message (519) to the source, which can respond with a message (520) indicating password acceptance.

Then, the controller can receive a change to one of the updatable properties from the user, and then sends a message (521) describing the updatable property to the source. The source acknowledges reception of the changed property with a message (522). After receiving message (522), the source can then determine which node had a property updated, and provide an indication 535 (node 2 being the affected node in this example) to that node as to which property of it was updated, so that the node can affect the update.

Other functionality that can be implemented by using messages sent from/to performance nodes relates to confirming requests for changing settings, reporting error messages, or rejecting a setting change request. For example, if there was an error in the nature of the changed property, such that node 2 could not make a change indicated by message 535, then node 2 can return an error message 545 indicating a problem with making the change. In turn, this error message can be propagated to the controller as a message 546, where a user can determine a response. In absence of an error, such as where node 2 made the change requested by message 535, message 545 can include a confirmation of such change. Then, message 546 in turn can include a confirmation of such change to the controller, which can effect a status update for display to a user. For example, if volume adjustment was requested, the controller would update its volume display in response to message 546. Thus, embodiments preferably include that the controller reflects a confirmed updated status of the device, based on acknowledged updates, rather than requested changes, or based on acknowledgements of requests from the A/V data source (which still may in some cases not result in actual settings changes). Any such acknowledgements settings also can include warnings that can request a further confirmation from a user via the controller, which would further result in an exchange of messages for that purpose.

Although updates to some node properties need to be effected by that node, other properties can be maintained by the source, and so messages relating to updates to those properties would not need to be transmitted to nodes, and can be implemented, and acknowledged by the data source to the controller. Further examples concerning properties that may be associated with A/V performance nodes are described with respect to FIG. 6.

FIG. 6 illustrates a table 600 that represents examples of properties that can be associated with A/V performance nodes (e.g., 110 and 115 of FIG. 1), and which can be maintained at the A/V source in a computer readable medium (e.g. computer 105).

FIG. 6 illustrates that a matrix of A/V performance nodes and respectively associated properties 625 can include a row for each node (rows 605, 610, 615, and 620) and a column for each property, such that a value located at row/column intersections identifies a value for that property for node associated with that row. Properties can include on/off status, capability information, parental control activation, content limitations, mood presets, equalizer settings, and relative volume. Some of these properties were described above.

Parental control can take a number of forms, and the present example illustrates a situation where each performance node is indicated as being protected or not protected by a parental password. Content limitations also can be expressed as properties stored with the A/V source, and the A/V source can enforce and maintain such properties. For example, while there may be no content limitation for a performance node located in a home office, a restrictive limitation may be enforced in a child's bedroom (row 610), while a less restrictive limitation may be enforced in a common living space (row 615). The limitations can be used to compare content ratings in content storage to determine whether performance of a given program at a given node is permitted.

Other examples of properties that can be included are properties that affect how a given item of content would be performed by a given A/V performance node. For example, properties affecting playback can be grouped into a common mood/content setting. For example, if movies are usually played in the living room, then a mood preset for audio and video settings appropriate for movies can be set for that A/V performance node.

By further example, a given A/V performance node may have access to an equalizer that allows adjust of relative volume components for different audio spectral levels. For example, a node can be associated with a 5 channel equalizer, such that a user wishing to adjust spectral content for that node would be presented with an option to select the equalizer property (an additional property shown in a screen according to the examples of FIG. 4a-4c). Input from the user may be obtained by drawing an appropriate equalizer with separately selectable spectral controls, detecting user inputs, and providing them to the appropriate node.

By further example, it may be provided that different speakers at a given node can be turned on and off separately. For example, a subwoofer may be turned off separately. These settings also can be comprehended in the mood presets. For example, a subwoofer for a "talk" preset may be off, and a relative volume set low. Because the changes to properties of each of the nodes come through computer 105, computer 105 can maintain accurate state information for each node.

Other properties that can be maintained and remotely updated for video-enabled performance nodes includes properties associated with its video display. Such properties include screen brightness, contrast, color balance, hue/saturation, and so on. Other video-specific properties that can be remotely updated include aspect ratio, refresh rate and resolution, which can vary among displays. Some content may be better presented in one aspect ratio or another, and in some cases, a display, and/or a performance node associated with a display, can reject or offer a different recommendation for adjustment of such settings.

In the above examples, various functionality and capabilities were attributed to computer 105, and such capabilities can be readily implemented by computer readable instructions stored in a computer readable medium available to a computer having one or more processing resources for executing such instructions.

Similarly, an example of a phone configured for software for communicating with computer 105, and providing user interface screens for obtaining user input concerning properties updates to A/V performance nodes was illustrated. However, a person of ordinary skill also would be able to understand based on these disclosures that other devices having wireless networking capability, and which can be programmed or otherwise configured to obtain property information from an A/V source concerning one or more remote A/V performance nodes, solicit user inputs for updating such properties, and communicate such updates to the A/V source can be used as a remote controller in accordance with these examples.

For sake of clarity, certain functionality and/or other capabilities were attributed to specific portions of a device, in some cases. However, such attribution does not imply a requirement that such functionality be implemented in that device portion, but rather as technological innovation continues variations on implementations of devices would be expected by those of ordinary skill based on these examples. For example, those of ordinary skill can make decisions concerning whether to implement a given function in hardware or as software configuring a processor, whether to use multiple different processors in a given system, one larger processor, and so on.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A system comprising:
a processor; and
a non-transitory computer-readable storage device storing instructions which, when executed by the processor, perform a method comprising:
receiving from a remote performance node over a wireless LAN a setting specific to the remote performance node, wherein the setting is selected from a group of reconfigurable settings, wherein the remote performance node is configured to receive and output digital content from an online marketplace of digital content;
modifying a remote control user interface to display a controllable function of the remote performance node, wherein the controllable function is adjusted to a current state value based on the received setting;
receiving input from a user associated with the controllable function;
communicating the input to the remote performance node.

2. The system of claim 1, wherein the remote performance node receives digital content over a wireless network.

3. The system of claim 1, wherein the remote performance node comprises-one of a wireless networking hub, a base station, and a relay.

4. The system of claim 1, wherein the remote performance node includes an audio speaker and a visual display.

5. The system of claim 1, wherein the remote performance node comprises an audio speaker, and the remote performance node reconfigurable settings comprise at least one of a relative audio volume or an active/inactive state.

6. The system of claim 1, wherein the remote performance node reconfigurable settings comprise at least one of a password, a relative volume control or an on/off status.

7. The system of claim 1, further comprising a music playback capability and the non-transitory computer-readable storage device storing digital content comprising music.

8. The system of claim 1, wherein the remote performance node comprises a visual display, and the reconfigurable settings comprise at least one of screen brightness or aspect ratio.

9. The system of claim 1, wherein the method further comprises receiving an error indication based on the input communicated to the remote performance node.

10. The system of claim 1, wherein the remote performance node comprises a wireless networking capability for receiving the digital content from an online marketplace.

11. The system of claim 1, wherein the group of reconfigurable settings includes at least one of relative audio volume, active/inactive state, parental control activation, content limitations, equalizer settings, capability information, or mood presets.

12. A non-transitory computer-readable storage medium storing instructions, which when executed by a computing device, cause the computing device to perform steps comprising:
receiving properties associated with a remote performance node capable of receiving, storing, and outputting digital content;
wirelessly instructing the remote performance node to obtain digital content from a distribution hub;
receiving an input from a user changing the properties associated with the remote performance node, the input received in response to displaying a controllable function of the remote performance node, wherein the controllable function is adjusted to a current state value based on the received properties;
forming a message indicative of changed properties associated with the remote performance node; and
transmitting the message to the distribution hub for retransmission to the remote performance node associated with the changed properties.

13. A remote control device, comprising:
a processor;
a wireless networking interface;
a display interface;
a non-transitory computer-readable storage medium storing a digital content and instructions, which when executed by the processor perform a method comprising:
receiving an input from a user to change, on a performance node networked to the remote control device via the wireless networking interface, a setting of the performance node;
wirelessly receiving from the performance node data indicative of the setting on the performance node;
presenting to the user on the display interface a menu comprising a controllable function of the performance node, wherein the controllable function is adjusted to a current state value based on the data indicative of the setting of the performance node;
wirelessly communicating to the performance node changes to the setting; and
presenting to the user on the display interface that the changes to the setting have been accepted by the performance node.

14. A method comprising:
receiving from a remote performance node a setting specific to the remote performance node, wherein the remote performance node is capable of receiving and outputting digital content from an online marketplace of digital content;
modifying a remote control user interface to display a controllable setting of the remote performance node, wherein the controllable setting is adjusted to a current state value based on the received setting;
receiving input from a user associated with the controllable setting; and
communicating the input to the remote performance node.

15. The method of claim 14, further comprising communicating via telephone.

16. The method of claim 14, further comprising storing the received digital content.

17. The method of claim 16, wherein the received digital content is at least one of video, music, and recorded audio.

18. The method of claim 14, wherein receiving the input and communicating the input to the remote performance node is accomplished via a 802.11 wireless connection.

19. The method of claim 14, wherein the remote control device is one of a smartphone, a handheld wireless enabled computing device having a touch-screen interface, and a tablet computer.

* * * * *